United States Patent
Nagashima (10) Patent No.: US 7,727,445 B2
(45) Date of Patent: Jun. 1, 2010

(54) METHOD FOR MANUFACTURING OPTICAL FILM

(75) Inventor: Katsusuke Nagashima, Kobe (JP)

(73) Assignee: Konica Minolta Opto, Inc., Tokyo (JP)

( * ) Notice: Subject to any disclaimer, the term of this patent is extended or adjusted under 35 U.S.C. 154(b) by 29 days.

(21) Appl. No.: 12/226,587

(22) PCT Filed: Apr. 2, 2007

(86) PCT No.: PCT/JP2007/057388

§ 371 (c)(1),
(2), (4) Date: Oct. 22, 2008

(87) PCT Pub. No.: WO2007/125729

PCT Pub. Date: Nov. 8, 2007

(65) Prior Publication Data

US 2009/0230576 A1    Sep. 17, 2009

(30) Foreign Application Priority Data

Apr. 28, 2006    (JP) .............................. 2006-125871

(51) Int. Cl.
*B29C 41/28* (2006.01)
*B29C 41/38* (2006.01)

(52) U.S. Cl. ........................ 264/216; 264/1.6; 264/212; 425/223; 425/224

(58) Field of Classification Search ................... 264/1.6, 264/212, 216; 425/223, 224, 471, DIG. 108; 198/844.1
See application file for complete search history.

(56) References Cited

U.S. PATENT DOCUMENTS

| 3,111,715 | A | * | 11/1963 | Hofer | .......................... 264/167 |
| 2006/0071363 | A1 | * | 4/2006 | Okutsu et al. | ............... 264/216 |
| 2007/0085235 | A1 | * | 4/2007 | Boyle et al. | .................. 264/216 |

FOREIGN PATENT DOCUMENTS

| JP | 51-137466 | U1 | | 11/1976 |
| JP | 57-156219 | A | | 9/1982 |
| JP | 2002-127169 | A | | 5/2002 |
| JP | 2002-234042 | | * | 8/2002 |
| JP | 2005-111669 | A | | 4/2005 |

* cited by examiner

*Primary Examiner*—Joseph S Del Sole
*Assistant Examiner*—Robert Dye
(74) *Attorney, Agent, or Firm*—Frishauf, Holtz, Goodman & Chick, P.C.

(57) ABSTRACT

A method for manufacturing an optical film comprising the steps of: 1) casting a dope (a solution), prepared by dissolving thermoplastic resin film raw materials in a solvent, from a casting die onto an at least 1.8 m wide belt support, and 2) drying a cast web (a cast film) peeled from the belt support, wherein the belt support has a thickness (Te) at both right and left end portions, of 5-20% less than a thickness (T) of the remaining portion including the transverse center portion of the belt support, provided that the Te indicates a thickness at both right and left end portions, each having a width (We) of 2-25% of a total width (W) of the belt support when viewed from both right and left side edges thereof.

12 Claims, 3 Drawing Sheets

METHOD FOR MANUFACTURING OPTICAL FILM

TECHNICAL FIELD

The present invention relates to a method for manufacturing an optical film used for various display devices such as liquid crystal display devices (LCDs) or organic EL (electroluminescence) display devices, specifically an optical film exhibiting birefringence used as a polarized plate protective film and a retardation film for these display devices.

BACKGROUND

A fundamental structure of a liquid crystal display device is commonly one in which a polarizing plate is provided on both sides of a liquid crystal cell. Since a polarizing plate passes only light of a polarized wave plane from a predetermined direction, it plays a significant role in visualizing variations of the orientation of a liquid crystal via an electric field in a liquid crystal display device, whereby performance of the liquid crystal display device largely depends on performance of the polarizing plate.

Over recent years, with the increased size of the screen of liquid crystal panels, wide polarizing plate protective films and retardation films have been urgently sought.

Conventionally, in manufacturing an optical film via a solution casting film forming method, a resin solution containing a desired component is cast on a rotationally-driven endless metal belt (belt support), dried to a conveyable state, peeled from the belt support, and then dried, followed by winding as a prepared film.

Herein, as a method for preparing a wider film, there is cited a manner of transverse stretching of a peeled film, however, which have ever produced problems that required optical characteristics were not realized; unviable or application-limited products resulted due to variation in mechanical characteristics.

Therefore, conventionally, a wide film has been manufactured by expanding the casting width via increase of the width of the belt support.

In contrast, to control meandering during film (web) conveyance using a belt support, the angle created by the rotational axes of a pair of front and rear rotating drums rotationally driving an endless metal belt is allowed to vary. For example, a method is employed in which the rotational axis of either one of the rotating drums is changed, to some extent, from a right angle to the moving direction of the belt support.

However, in such meandering control of the belt support, since strong force is loaded to belt end portions, repetitive control tends to deform the belt end portions. Especially, when the width of the belt support exceeds 1.8 m, such deformation becomes pronounced. With large deformation, the contact between the belt end portions and a heating/cooling drum becomes weak, between which heat transfer is decreased, resulting in occurrence of incomplete drying of the end portions and bubble defects at the end portions. It has been noted that the problem of incomplete drying of the belt end portions resulted in incomplete peeling wherein a part of the film remained on the belt during peeling; and when the right and left end portions of the belt support were further largely deformed, the flatness of film products became deteriorated and the apparatus was damaged via contact between the belt support end portions and the casting die, resulting in adverse effects during film manufacturing.

Herein, a patent document relating to a conventional method for manufacturing an optical film via a solution casting film forming method employing a wide belt support is as follows:

Patent Document 1 discloses a solution film forming method, and describes that a belt featuring a width of at least 1.6 m is used as a support to support a polymer solution film cast from a die; the amount of meandering of the belt is controlled to be at most ±0.5% based on the belt width; and also the casting width of the film from the die is controlled to be at least 70% of the belt width, as well as being controlled to be at most [belt width−(meandering amount×4)].

Patent Document 1: Unexamined Japanese Patent Application Publication No. (hereinafter, referred to as JP-A) 2002-127169

DISCLOSURE OF THE INVENTION

Problems to be Solved by the Invention

As described above, in Patent Document 1, with regard to a wide belt support, the casting width of a film is specified based on the belt width to minimize the amount of meandering, still resulting, however, in meandering to some extent. Therefore, the problem has been noted that the above belt end portions tend to be deformed during long-term operations.

An object of the present invention is to provide a method for manufacturing an optical film which solves the problems in the conventional technology, as well as exhibiting minimal meandering, maintaining a steady conveyance state, being free from incomplete drying of cast film (web) end portions and from deterioration of the flatness of the film, and stably maintaining high productivity, even when a wide belt support is used in film manufacturing.

Means to Solve the Problems

To solve the above problems in the conventional technology, the present inventor conducted diligent investigations, and then found that in a solution casting film forming method, stress loaded to a belt support during meandering control became minimal, and deformation of both belt support end portions after long-term operations was inhibited by employing the methods described below. Thus, the present invention was completed.

Item 1. A method for manufacturing an optical film comprising the steps of:

1) casting a dope (a solution), prepared by dissolving thermoplastic resin film raw materials in a solvent, from a casting die onto an at least 1.8 m wide belt support, and 2) drying a cast web (a cast film) peeled from the belt support, wherein the belt support has a thickness (Te) at both right and left end portions, of 5-20% less than a thickness (T) of a remaining portion including a transverse center portion of the belt support, provided that the Te indicates a thickness at both right and left end portions, each having a width (We) of 2-25% of a total width (W) of the belt support when viewed from both right and left side edges thereof.

Item 2. The method for manufacturing the optical film described in Item 1 above, wherein the belt support has the thickness (Te) of 8-15% less than the thickness (T) of the remaining portion including the transverse center portion of the belt support, provided that the Te indicates the thickness at both right and left end portions, each having the width (We) of 2-25% of the total width (W) of the belt support when viewed from both right and left side edges thereof.

Item 3. The method for manufacturing the optical film described in Item 1 above, wherein the above belt support has the thickness (Te) at both right and left end portions of 5-20% less than the thickness (T) of the remaining portion including the transverse center portion of the belt support, provided that the Te indicates the thickness at both right and left end portion, each having the width (We) of 10-20% of the total width (W) of the belt support when viewed from both right and left side edges thereof.

Item 4. The method for manufacturing the optical film described in Item 1 above, wherein the above belt support has the thickness (Te) at both right and left end portions of 8-15% less than thickness (T) of the remaining portion including the transverse center portion of the belt support, provided that the Te indicates the thickness at both right and left end portions, each having the width (We) of 10-20% of the total width (W) of the belt support when viewed from both right and left side edges thereof.

Item 5. The method for manufacturing the optical film, described in any one of Items 1-4 above, wherein the above belt support is united by welding of both right and left end portions having a thinner portion of the belt support and the remaining thicker portion including the transverse center portion.

Item 6. A method for manufacturing an optical film comprising the steps of:

1) casting a dope (a solution), prepared by dissolving a thermoplastic resin film raw material in a solvent, on a belt support of a width of at least 1.8 m from a casting die, and 2) drying a cast web (a cast film) peeled from the belt support, wherein the above belt support has a longitudinal elastic modulus (Ee) of both right and left end portions, each having a width (We) of 2-25% of a total width (w) of the belt support when viewed from both right and left side edges thereof, is 5-20% less than a longitudinal elastic modulus (E) of a remaining portion including a transverse center portion of the belt support.

Item 7. The method for manufacturing the optical film described in Item 6 above, wherein the above belt support has the longitudinal elastic modulus (Ee) of both right and left end portions, each having the width (We) of 2-25% of the total width (W) of the belt support when viewed from both right and left side edges thereof, is 8-15% less than the longitudinal elastic modulus (E) of the remaining portion including the transverse center portion of the belt support.

Item 8. The method for manufacturing the optical film described in Item 6 above, wherein the above belt support has the longitudinal elastic modulus (Ee) of both right and left end portions, each having the width (We) of 10-20% of the total width (W) of the belt support when viewed from both right and left side edges thereof, is 5-20% less than the longitudinal elastic modulus (E) of the remaining portion including the transverse center portion of the belt support.

Item 9. The method for manufacturing the optical film described in Item 6 above, wherein the above belt support has the longitudinal elastic modulus (Ee) of both right and left end portions, each having the width (We) of 10-20% of the total width (W) of the belt support when viewed from both right and left side edges thereof, is 8-15% less than the longitudinal elastic modulus (E) of the remaining portion including the transverse center portion of the belt support.

Item 10. The method for manufacturing the optical film described in any one of Items 6-9 above, wherein the above belt support is united by welding of both right and left end portions, featuring a smaller longitudinal elastic modulus, of the belt support and the remaining portion, featuring a larger longitudinal elastic modulus, including the transverse center portion.

Item 11. The method for manufacturing an optical film described in any one of Items 1-10 above, wherein the width of the aforesaid optical film is at least 1.7 m.

Item 12. The method for manufacturing an optical film described in any one of Items 1-11 above, wherein the aforesaid thermoplastic resin film raw materials contain a cellulose ester.

EFFECTS OF THE INVENTION

The invention of Item 1 relates to a method for manufacturing the optical film via a solution casting film forming method, wherein the thickness (Te) at both right and left end portions of a wide belt support, featuring a width of at least 1.8 m, each having a width (We) of 2-25% of the total width (W) of the belt support when viewed from both right and left side edges thereof, is 5-20% less than the thickness (T) of the remaining portion including the transverse center portion of the belt support. According to the present invention, the thickness of belt end portions (or edge portions) on the right and left sides of the belt support is allowed to be smaller for minimal deformation of both film end portions tending to occur in cases of using a wide belt support in film manufacturing, whereby stress loaded to the belt support during meandering control is minimized; deformation of the both end portions of the belt support after long-term operations is inhibited; a steady conveyance state with minimal meandering is maintained; neither incomplete drying of cast film (web) end portions nor deterioration of the flatness of the film occurs; and then high productivity can stably be maintained. Thus, the effect of manufacturing an optical film exhibiting excellent quality can be produced.

The inventions of Items 2-4 each further limit a belt support used in the method for manufacturing the optical film, described in Item 1, whereby deformation of both end portions of the belt support after long-term operations can more effectively be inhibited.

The invention of Item 5 relates to the method for manufacturing the optical film, described in any one of Items 1-4, wherein the belt support is used which is prepared by uniting, via welding, both right and left end portions constituted of a thinner belt support and the remaining thicker portion including the transverse center portion, resulting in use of a desired wide belt support, whereby a steady conveyance state with minimal meandering is maintained; neither incomplete drying of cast film (web) end portions nor deterioration of the flatness of the film occurs; and high productivity can stably be maintained. Thus, the effect of manufacturing an optical film exhibiting excellent quality can be produced.

The invention of Item 6 relates to the method for manufacturing the optical film via a solution casting film forming method, wherein the longitudinal elastic modulus (Ee) of both right and left end portions of a belt support, featuring a width of at least 1.8 m, each having a width (We) of 2-25% of the total width (W) of the belt support when viewed from both right and left side edges thereof is allowed to be 5-20% less than the longitudinal elastic modulus (E) of the remaining portion including the transverse center portion of the belt support. According to the present invention, the longitudinal elastic modulus of belt end portions (or edge portions) on the right and left sides of a belt support is allowed to be smaller for minimal deformation of both film end portions tending to occur in cases of using a wide belt support in film manufacturing, whereby stress loaded to the belt support during meandering control is minimized; deformation of the both end portions of the belt support after long-term operations is inhibited; a steady conveyance state with minimal meandering is maintained; neither incomplete drying of cast film (web) end portions nor deterioration of the flatness of the film occurs; and then high productivity can stably be maintained. Thus, the effect of manufacturing an optical film exhibiting excellent quality can be produced.

The inventions of Items 7-9 each further limit a belt support used in a method for manufacturing an optical film, described in Item 6, whereby deformation of both end portions of the belt support after long-term operations can more effectively be inhibited.

The invention of Item 10 relates to a method for manufacturing an optical film, described in any one of Items 6-9, wherein there is used a belt support prepared by uniting, via welding, both right and left end portions, featuring a smaller longitudinal elastic modulus, of the belt support and the remaining portion, featuring a larger longitudinal elastic modulus, including the transverse center portion, resulting in use of a desired wide belt support, whereby a steady conveyance state with minimal meandering is maintained; neither incomplete drying of cast film (web) end portions nor deterioration of the flatness of the film occurs; and high productivity can stably be maintained. Thus, the effect of manufacturing an optical film exhibiting excellent quality can be produced.

The invention of Item 11 relates to a method for manufacturing an optical film, described in any one of Items 1-10, wherein the width of the optical film is at least 1.7 m, whereby a method for an optical film specifically suitable for manufacturing a wide optical film capable of responding to display devices featuring large area screens.

The invention of Item 12 relates to a method for manufacturing an optical film, described in any one of Items 1-11, wherein the above thermoplastic resin film raw material contains a cellulose ester, whereby a method for manufacturing an optical film specifically suitable for a polarizing plate protective film and a retardation film can be provided.

BRIEF DESCRIPTION OF THE DRAWINGS

FIG. 7a of FIG. 7 is a plan view showing a state where the angle of the rotational axis of a rotating drum is changed to control meandering during conveyance of a belt support in a casting process of a solution casting film forming apparatus, and FIG. 7b thereof is a corresponding side view.

DESCRIPTION OF THE SYMBOLS

1: endless metal belt: belt support
1a: remaining portion including the transverse center portion of a belt support
1b: both right and left end portions of a belt support
2: front drum
3: rear drum
4: casting die
T: thickness of both right and left end portions of a belt support
Te: thickness of the remaining portion including the transverse center portion of a belt support
W: width of both right and left end portions of a belt support
We: width of the remaining portion including the transverse center portion of a belt support
d: amount of belt end portion deformation
11: belt test sample piece (belt support)
12: rotating drum
13: rotational axis
15: tension meter

BEST MODE TO CARRY OUT THE INVENTION

The best mode to carry out the present invention will now be described that by no means limits the scope of the present invention.

The present invention relates to a method for manufacturing an optical film via a solution casting film forming method, wherein an optical film is manufactured by casting a dope (solution), prepared by dissolving a thermoplastic resin film raw material in a solvent, on a rotationally-driven endless metal belt (belt support) featuring a width of at least 1.8 m from a casting die, followed by drying a web (film) having been peeled from the belt support.

Figure 1:
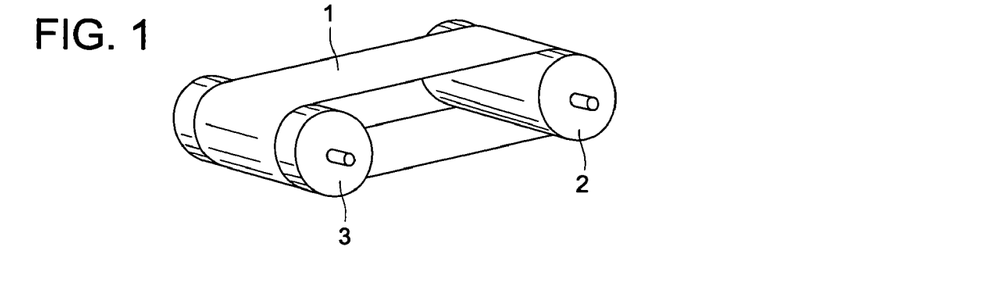
FIG. 1 is a partially enlarged oblique perspective view showing a first embodiment of a belt support in a casting process of a solution casting film forming apparatus carrying out the method for manufacturing an optical film of the present invention.
Figure 2:
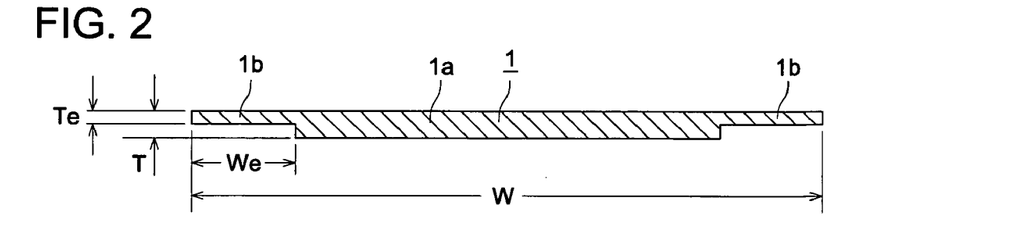
FIG. 2 is an enlarged transverse cross-sectional view of the belt support of FIG. 1.
Figure 3:
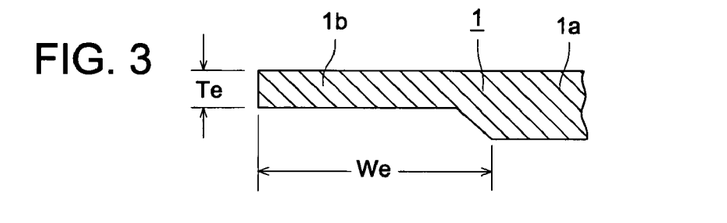
FIG. 3 is a main portion-enlarged cross-sectional view of FIG. 2.

Referring to FIGS. 1-3, in the inventions of Items 1-5, the thickness (Te) of both right and left end portions (1b) of an endless metal belt (belt support) (1) each having a predetermined width (We) from both right and left side edges of the belt support wound around a pair of rotationally-driven front and rear drums (2) and (3) is smaller than the thickness (T) of the remaining portion (1a) including the transverse center portion of the belt support.

Herein, the width of a belt support is a dimension defined by FIG. 2 (a transverse cross-sectional view of a belt support), satisfying $$2(\%) \geq (We/W) \times 100 \leq 25(\%),$$

specifically preferably $10(\%) \leq (We/W) \times 100 \leq 20(\%)$.

The difference in thickness of a belt support is a dimension defined also by FIG. 2, satisfying $$5(\%) \leq (1-Te/T) \times 100 \leq 20(\%),$$

specifically preferably $8(\%) \leq (1-Te/T) \times 100 \leq 15(\%)$.

In this way, the inventions of Items 1-5 relate to a method of minimizing deformation of both right and left end portions (1b) of a belt support (1) tending to occur in cases of using a wide belt support (1) of at least 1.8 m in optical film manufacturing. When the thickness of the both end portions (1b) of the belt support (1) is allowed to be smaller, stress loaded to the both belt end portions (1b) during meandering control becomes minimal, whereby deformation of the both belt end portions (1b) after long-term operations is inhibited.

Figure 4:
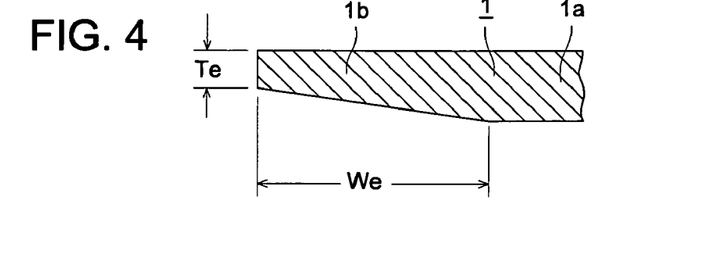
FIG. 4 is a view showing a deformation example of a belt support in the main portion-enlarged cross-sectional view.

The thickness may be changed in a stepwise manner as shown in FIGS. 2 and 3, but it is preferable to be smoothly changed in a tapered manner as shown in FIG. 4. In this case, the width and thickness of a belt end portion are defined as shown in FIG. 4.

As a method of decreasing the thickness of both right and left end portions (1b) of a belt support (1), the both right and left end portions of the belt support (1) may mechanically be processed, or appropriate materials each differing in thickness may be welded to the both end portions as described in Item 5.

According to the present invention, an optical film exhibiting excellent quality can be manufactured, wherein meandering is minimized even in cases of use of a wide belt; a steady film conveyance state is maintained; neither incomplete drying of cast film (web) end portions nor deterioration of the flatness of the film occurs; and then high productivity can stably be maintained.

Figure 5:
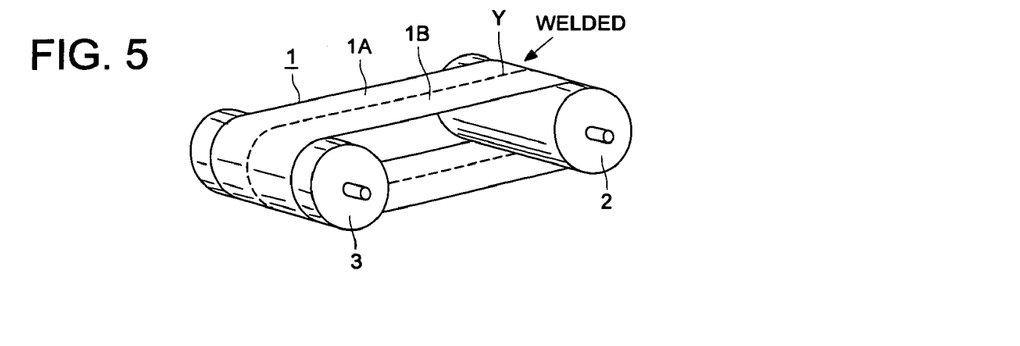
FIG. 5 is a partially enlarged oblique perspective view showing a second embodiment of a belt support in a casting process of a solution casting film forming apparatus carrying out the method for manufacturing an optical film of the present invention.
Figure 6:
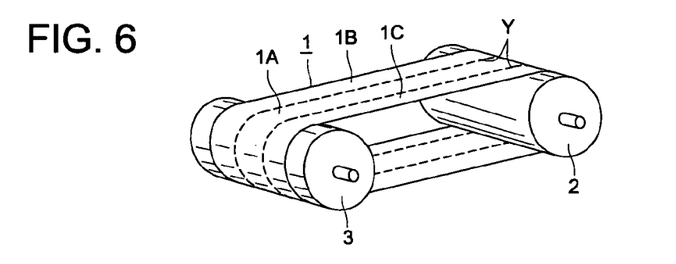
FIG. 6 is a partially enlarged oblique perspective view showing a third embodiment of a belt support in a casting process of a solution casting film forming apparatus carrying out the method for manufacturing an optical film of the present invention.

Incidentally, there is an upper limit to the width of the belt support (1), depending on the ability of an apparatus manufacturer. However, as shown in FIG. 5, a wide belt support (1) prepared by welding side edges of 2 belt supports (1A) and (1B) may be used. When a wider belt support (1) is needed, it is only necessary to weld side edges of 3 belt supports (1A), (1B), and (1C), as shown in FIG. 6.

Herein, a welded portion (Y) of the belt support (1) is ground to be a mirror surface to the extent that no problem in product quality is posed even via transfer to a film. When the film quality of the welded portion (Y) is problematic, a welding line only needs to be positioned so as to allow the welded portion (Y) to efficiently become a substandard product.

Referring to FIGS. 1-3, in the inventions of Items 6-10, the longitudinal elastic modulus (Young's modulus) (Ee) of both right and left end portions (1b) of a wide belt support (1) of a width of at least 1.8 m each having a predetermined width (We) from both right and left side edges of the belt support is smaller than the longitudinal elastic modulus (E) of the remaining portion (1a) including the transverse center portion of the belt support.

Herein, the width of a belt support is a dimension defined by FIG. 2 (a transverse cross-sectional view of a belt support), satisfying $$5(\%) \leq We/W \times 100 \leq 25(\%),$$

specifically preferably $10(\%) \leq We/W \times 100 \leq 20(\%)$.

When the longitudinal elastic modulus of both right and left end portions (1b) of a belt support is designated as Ee, and the longitudinal elastic modulus of the remaining portion (1a) including the transverse center portion of the belt support is designated as E, the longitudinal elastic modulus satisfies $$5(\%) \leq (1-Ee/E) \times 100 \leq 20(\%),$$

specifically preferably $8(\%) \leq (1-Ee/E) \times 100 \leq 15(\%)$.

In this manner, the inventions of Items 6-10 relate to another method of minimizing deformation of both right and left end portions (1b) of a belt support (1) tending to occur in cases of using a wide belt support of a width of at least 1.8 m in optical film manufacturing. When the longitudinal elastic modulus (Ee) of the both right and left end portions (1b) of the belt support (1) is allowed to be smaller, deformation of the both right and left end portions (1b) thereof is minimized.

For a method of changing the longitudinal elastic modulus of both right and left end portions (1b) of a belt support (1), the both right and left end portions (1b) of the belt support may be thermally treated, or metals of different materials may be welded to the both end portions. Further, a member having voids in the thickness direction may be welded to the both end portions. For example, as shown in FIG. 6, it is only necessary to weld side edges of 3 belt supports (1A), (1B), and (1C) each constituted of metals of different materials.

Then, in the same manner as in the above case, welded portions (Y) of the belt support (1) are ground to a mirror surface to the extent that no problem in product quality is posed even via transfer to a film. When the film quality of the welded portions (Y) is problematic, welding lines only need to be positioned so as to allow the welded portions (Y) to efficiently become substandard products.

The inventions of Items 1 and 6 of the present invention are sufficiently effective even when each carried out individually, being, however, more effective when conducted together. Namely, it is also possible to reduce the thickness of both right and left end portions (1b) of a belt support (1) and, at the same time, to allow the longitudinal elastic modulus to be smaller.

Figure 7:
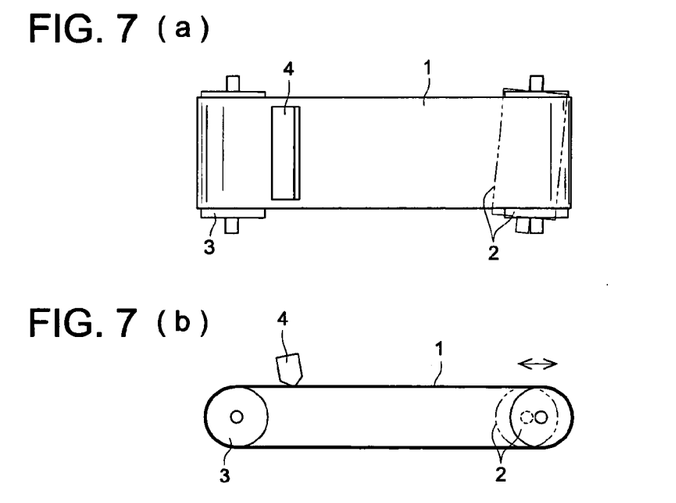

As shown in FIG. 7, to control meandering using a belt support (1) during conveyance, the angle created by the rotational axes of a pair of front and rear rotating drums (2) and (3), which rotationally drives an endless metal belt (1), is allowed to vary. For example, a method is employed in which the rotational axis of the front rotating drum (2) is changed, to some extent, from a right angle to the moving direction of the belt support (1).

When the width of a belt support is as large as at least 1.8 m, such meandering control becomes difficult, whereby the amount of meandering of the belt support (1) is increased. When the amount of meandering of the belt support (1) is remarkably large, a dope (resin solution) cast form a casting die (4) drops outside the belt support (1), resulting in contaminated production equipment. Further, when the belt support (1) is operated for a long period of time in a state where large meandering is controlled at all times, large force continues to be loaded specifically to both right and left end portions of the belt support (1), whereby the both right and left end portions (or both side edge portions) of the belt support (1) is deformed in a wavy form (in a so-called brown seaweed-like form) when viewed form the side. Large deformation of the both right and left end portions of the belt support (1) causes weak contact between the belt support end portions and a heating/cooling drum, between which heat transfer is decreased, resulting in occurrence of incomplete drying of the film end portions and bubble defects at the film end portions. Further, incomplete drying of the film end portions results in incomplete peeling, wherein a part of the film (web) remains on the belt support side during peeling of the film. Larger deformation of the both right and left end portions of the belt support causes deterioration of the flatness of film products and also equipment damage via contact of the belt support (1) end portions with the casting die (4), resulting in adverse effects in film manufacturing.

In the inventions of Items 1-5, the thickness (Te) of both right and left end portions (1*b*) of a belt support is smaller than the thickness (T) of the remaining portion (1*a*) including the transverse center portion of the belt support. Therefore, the force loaded to the both right and left end portions (1*b*) of the belt support is reduced, resulting in minimal deformation of the both right and left end portions (1*b*) of the belt support even via repetitive control.

However, when the thickness is excessively reduced as small as $(1-Te/T) \times 100 > 20(\%)$, incomplete peeling due to poor heat transfer may occur similarly to the above deformation. Further, when the width (We) of the both right and left end portions is more than 25% of the total width (W) of the belt support, no force to control meandering tends to be loaded, resulting in more pronounced meandering.

Therefore, when the thickness (Te) of both right and left end portions (1*b*) of a belt support satisfies $5(\%) \leq (1-Te/T) \times 100 \leq 20(\%)$, and the width (We) of the both right and left end portions (1*b*) of the belt support satisfies $2(\%) \leq (We/W) \times 100 \leq 25(\%)$, minimal deformation of the both right and left end portions (1*b*) of the belt support is realized and incomplete peeling does not occur, and further the amount of meandering is minimized.

Further, in the inventions of Items 6-10, the longitudinal elastic modulus (Ee) of both right and left end portions (1*b*) of a belt support is smaller than the longitudinal elastic modulus (E) of the remaining portion (1*a*) including the transverse center portion of the belt support. In this manner, even when the longitudinal elastic modulus (Ee) of the both right and left end portions (1*b*) of the belt support is allowed to be smaller, similarly to the case in which the thickness (Te) of the both right and left end portions (1*b*) of the belt support is allowed to be smaller, minimal deformation of the both right and left end portions (1*b*) of the belt support is realized and also film formation is realized in a state where incomplete peeling does not occur and the amount of meandering is minimized.

The width (We) of a portion with a smaller longitudinal elastic modulus (Ee) of both right and left end portions (1*b*) of a belt support satisfies $5(\%) \leq We/W \times 100 \leq 25(\%)$, specifically preferably $10(\%) \leq (We/W) \times 100 \leq 20(\%)$. Further, the longitudinal elastic modulus (Ee) of the both right and left end portions (1*b*) of the belt support satisfies $5(\%) \leq (1-Ee/E) \times 100 \leq 20(\%)$, specifically preferably $8(\%) \leq (1-Ee/E) \times 100 \leq 15(\%)$.

In this manner, according to the present invention, even when a wide belt support (1) is used in film manufacturing, a steady conveyance state with minimal meandering is maintained; neither incomplete drying of cast film (web) end portions nor deterioration of the flatness of the film occurs; and then high productivity can stably be maintained.

The present invention will now be detailed.

Resins preferably used in the method of the present invention include, for example, cellulose ester-based resins of an acyl group substitution degree of 1.8-2.80 such as cellulose acetate, cellulose acetate propionate, or cellulose acetate butyrate; cellulose ether resins of an alkyl group substitution degree of 2.0-2.80 such as cellulose methyl ether, cellulose ethyl ether, or cellulose propyl ether; cycloolefin resins; norbornene-based resins; polycarbonate resins; polyamide resins such as polymers of an alkylene dicarboxylic acid with a diamine; polyester resins such as polymers of an alkylene dicarboxylic acid with a diol, polymers of an alkylene diol with a dicarboxylic acid, polymers of a cyclohexane dicarboxylic acid with a diol, polymers of a cyclohexane diol with a dicarboxylic acid, or polymers of an aromatic dicarboxylic acid with a diol; vinyl acetate resins such as polyvinyl acetate or vinyl acetate copolymers; polyvinyl acetal resins such as polyvinyl acetal or polyvinyl butyral; epoxy resins; ketone resins; and polyurethane resins such as linear polymers of an alkylene diisocyanate with an alkylene diol. At least one compound selected from these compounds is preferably contained.

Of these, there are specifically preferable cellulose ester-based resins such as cellulose acetate, cellulose acetate propionate, or cellulose acetate butyrate; cycloolefin resins; norbornene-based resins; and polycarbonate resins. Further, dope dissolution to be described later may be carried out by blending at least 2 types of polymers exhibiting compatibility. However, the present invention is not limited thereto.

Other resins preferably used in the present invention include homopolymers or copolymers featuring an ethylenically unsaturated monomer unit. There are more preferably listed homopolymers or copolymers of an acrylate or methacrylate such as polymethylacrylate, polyethylacrylate, polypropylacrylate, polycyclohexylacrylate, copolymers of an alkyl acrylate, polymethylmethacrylate, polyethylmethacrylate, polycyclohexylmethacrylate, or copolymers of an alkyl methacrylate. Further, since esters of acrylic acid or methacrylic acid exhibit excellent transparency and compatibility, homopolymers or copolymers featuring an acrylate or methacrylate unit, specifically homopolymers or copolymers featuring a methyl acrylate or methacrylate unit are preferable. Specifically, polymethylmethacrylate is preferable. With regard to alicyclic alkyl esters of acrylic acid or methacrylic acid such as polycyclohexylacrylate or polycyclohexylmethacrylate, those having advantages such as enhanced heat resistance, low hygroscopic properties, or low birefringence are preferable.

The method for manufacturing an optical film of the present invention is carried out via a solution casting film forming method, which will now be detailed.

(Dope-Forming Materials)

The present invention will be described with reference to a cellulose ester as an example.

In the present invention, a cellulose ester solution containing a cellulose ester and an organic solvent refers to a dope. With this, solution casting film formation is carried out to form a cellulose ester film.

(Cellulose Esters)

Cellulose raw materials for the cellulose ester used in the present invention are not specifically limited, including cotton linter, wood pulp, and kenaf. Further, cellulose esters produced therefrom can be used individually or by mixing at any appropriate ratio.

In the present invention, when an acylating agent for a cellulose raw material is an acid anhydride (such as acetic anhydride, propionic anhydride, or butyric anhydride), reaction to prepare a cellulose ester is carried out using an organic acid such as acetic acid or an organic solvent such as methylene chloride, as well as using a protic catalyst such as sulfuric acid. When the acylating agent is an acid chloride (such as $CH_3COCl$, $C_2H_5COCl$, or $C_3H_7COCl$), reaction is conducted using a basic compound such as an amine as a catalyst. Specifically, it is possible to be synthesized via the method described in Unexamined Japanese Patent Application Publication (hereinafter referred to as JP-A) No. 10-45804.

A cellulose ester is prepared by allowing an acyl group to react with hydroxyl groups of cellulose molecules. The cellulose molecules are composed of numerous linked glucose units, containing 3 hydroxyl groups per glucose unit. The number of introduction of an acyl group into these 3 hydroxyl groups refers to a substitution degree. For example, in cellulose triacetate, an acetyl group bonds to all of the 3 hydroxyl groups of a glucose unit.

A cellulose ester employable for a cellulose ester film preferably features a total acyl group substitution degree of 2.4-2.8.

The molecular weight of a cellulose ester used in the present invention is preferably 50,000-200,000 in terms of the number average molecular weight (Mn), more preferably 60,000-200,000, specifically preferably 80,000-200,000.

In the cellulose ester used in the present invention, the ratio Mw/Mn of the weight average molecular weight (Mw) to the number average molecular weight (Mn) is preferably in the range of 1.4-3.0, more preferably 1.7-2.2.

The average molecular weight and molecular weight distribution of the cellulose ester is determined by a method known in the art via high-performance liquid chromatography. Using this, the number average molecular weight and the weight average molecular weight are derived to calculate the ratio (Mw/Mn).

Measurement conditions are as follows.

Solvent: Methylene chloride

Column: Shodex K806, K805, and K803G (These three columns produced by Showa Denko K. K. were connected for this use).

Column temperature: 25° C.

Sample concentration: 0.1% by weight

Detector: RI Model 504 (produced by GL Sciences Inc.)

Pump: L6000 (produced by Hitachi, Ltd.)

Flow rate: 1.0 ml/minute

Calibration curve: A calibration curve, based on 13 samples of Standard Polystyrene STK, standard polystyrene (produced by Tosoh Corp.) featuring a molecular weight of 1000000-500, was used. The 13 samples are preferably used at almost even intervals.

The cellulose ester used in the present invention is preferably a carboxylic acid ester having about 2-22 carbons, specifically preferably a lower fatty acid ester of cellulose.

The lower fatty acid in the lower fatty acid ester of cellulose refers to a fatty acid having at most 6 carbon atoms. There can be used, for example, cellulose acetate, cellulose propionate, cellulose butyrate, and cellulose acetate phthalate, as well as a mixed fatty acid ester such as cellulose acetate propionate or cellulose acetate butyrate described in JP-A Nos. 10-45804 and 8-231761, and U.S. Pat. No. 2,319,052. An ester of an aromatic carboxylic acid and cellulose described in JP-A Nos. 2002-179701, 2002-265639, and 2002-265638, and cellulose acylate are also preferably usable.

Of these, a lower fatty acid ester of cellulose preferably used includes cellulose triacetate and cellulose acetate propionate. These cellulose esters can also be used in combination.

Preferable cellulose esters other than cellulose triacetate include ones having an acyl group having 2-4 carbon atoms as a substituent and simultaneously satisfying the following expressions (a) and (b) when the acetyl group substitution degree is X and the propionyl or butyryl group substitution degree is Y.

$2.4 \leq X+Y \leq 2.8$ \hfill Expression (a)

$0 \leq X \leq 2.5$ \hfill Expression (b)

Portions unsubstituted with an acyl group commonly exist as a hydroxyl group. These can be synthesized via a method known in the art.

The acyl group substitution degree thereof can be determined based on the method specified by ASTM-D817-96.

In the case of acetyl cellulose, it is necessary to extend acetylation reaction duration to increase the acetylation rate. However, with excessively long reaction duration, decomposition simultaneously proceeds and then polymer chain breakage and acetyl group decomposition occur, leading to unfavorable results. Therefore, in order to increase the acetylation rate and control decomposition to some extent, it is necessary to set the reaction duration within a certain range. Specified conditions by reaction duration are not appropriate, since various reaction conditions exist, which vary depending greatly on the reaction apparatus and equipment, as well as other conditions. As decomposition of a polymer proceeds, molecular weight distribution becomes broader. Therefore, even in the case of cellulose ester, the degree of decomposition can be specified by a value of weight average molecular weight (Mw)/number average molecular weight (Mn) commonly employed. Namely, in a process of acetylation of cellulose triacetate, a value of weight average molecular weight (Mw)/number average molecular weight (Mn) can be employed as an indicator for the degree of reaction, in order to carry out acetylation reaction for a sufficient period of time for the acetylation with no excessive decomposition due to excessively extended duration.

One example of a production method of a cellulose ester will now be described. As a cellulose raw material, 100 parts by weight of cotton linter was pulverized and 40 parts by weight of acetic acid was added thereto, followed by pretreatment for activation at 36° C. for 20 minutes. Then, 8 parts by weight of sulfuric acid, 260 parts by weight of acetic anhydride, and 350 parts by weight of acetic acid were added to carry out esterification at 36° C. for 120 minutes. The resulting product was neutralized by 11 parts by weight of a magnesium acetate aqueous solution of 24% by weight and saponified and ripened at 63° C. for 35 minutes to obtain acetyl cellulose. The acetyl cellulose was stirred at room temperature for 160 minutes using a tenfold amount of an acetic acid aqueous solution (acetic acid:water=1:1 (weight ratio)), followed by being filtered and dried to obtain purified acetyl cellulose of an acetyl substitution degree of 2.75. The acetyl cellulose features Mn of 92,000, Mw of 156,000, and Mw/Mn of 1.7. Similarly, cellulose esters featuring different substitution degrees and Mw/Mn ratios can be synthesized by controlling esterification conditions (temperature, duration, and stirring) and hydrolysis conditions for the cellulose esters.

Incidentally, the synthesized cellulose ester is preferably subjected to purification to remove low molecular weight components and to filtration to remove unacetylated components.

Further, a mixed acid cellulose ester can be obtained by the method described in JP-A No. 10-45804. The acyl group substitution degree can be determined based on the method specified in ASTM-D817-96.

The cellulose ester is affected by minor metal components contained therein. It is thought that these are relevant to water used in the manufacturing process. The amount of components, which may become insoluble cores, is preferably small. The amount of metal ions such as iron, calcium, or magnesium is preferably small, since such ions may form insoluble substances via salt formation with polymer decomposition products which may contain an organic acid group. The content of iron (Fe) components is preferably at most 1 ppm. An abundant amount of calcium (Ca) components is contained in ground water and river water, and a higher content thereof results in hard water, which is unsuitable for drinking water. Calcium components tend to form a coordination compound or a complex with an acidic component such as a carboxylic acid or sulfonic acid, or many kinds of ligands, resulting in formation of scum (insoluble precipitated and turbid substances) resulting from a large amount of insoluble calcium.

The content of calcium (Ca) components is at most 60 ppm, preferably 0-30 ppm. The content of magnesium (Mg) components is preferably 0-70 ppm, specifically preferably 0-20 ppm, since an excessive amount thereof forms insoluble substances. The content of metal components such as iron (Fe), calcium (Ca), and magnesium (Mg) can be determined via analysis using ICP-AES (inductively coupled plasma-atomic emission spectrometry) after pre-treatment of an absolutely dried cellulose ester using a micro-digesting wet decomposition apparatus (decomposition with sulfuric-nitric acid) and then via alkali fusion.

(Organic Solvents)

Organic solvents usable for forming a dope (solution) by dissolving a cellulose ester include basic organic solvents and non-basic organic solvents. The basic organic solvents include methylene chloride, suitable for dissolving a cellulose ester, specifically cellulose triacetate.

Use of non-basic organic solvents has been investigated in view of recent environmental concerns. The non-basic organic solvents include, for example, methyl acetate, ethyl acetate, amyl acetate, acetone, tetrahydrofuran, 1,3-dioxolan, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, and nitroethane.

When these organic solvents are used for cellulose triacetate, a dissolution method at room temperature is employable, but a dissolution method such as a high temperature dissolution method, a cooling dissolution method, or a high pressure dissolution method is preferably used due to formation of a less amount of insoluble substances. Methylene chloride can be used for a cellulose ester other than cellulose triacetate. However, methyl acetate, ethyl acetate, or acetone is preferably used. Methyl acetate is specifically preferably employed. In the present invention, organic solvents exhibiting excellent solubility to the cellulose esters descried above refer to good solvents, and of organic solvents having a main effect on dissolution, an organic solvent used in a large quantity refers to a principal (organic) solvent or a main (organic) solvent.

In the present invention, alcohols having 1-4 carbon atoms are preferably contained at 1-40% by weight in a dope, in addition to any appropriate organic solvents described above. These strengthen a web wherein a dope is cast on a support and then a solvent begins to evaporate, and as the alcohol ratio is increased, a dope film (web) is gelated; and are used as gelling solvents which facilitate peeling of the web from a metal support, as well as playing a role in promoting dissolution of a cellulose ester with a non-basic organic solvent when the ratio thereof is small. As alcohols having 1-4 carbon atoms, there can be listed methanol, ethanol, n-propanol, isopropanol, n-butanol, sec-butanol, and tert-butanol. Of these, ethanol is preferable from the viewpoint of excellent dope stability, a relatively low boiling point, and excellent drying properties. These organic solvents refer to poor solvents due to no solubility to a cellulose ester on their own.

A cellulose ester is preferably prepared so that the concentration thereof may be in the range of 15-30% by weight in a dope and the dope viscosity may be in the range of 100-500 Pa·s to achieve excellent film surface quality.

Additives added in a dope include fine particles such as a plasticizer, a UV absorbent, an antioxidant, a dye, or a matting agent. In the present invention, these additives may be added when a cellulose ester solution is prepared or when a fine particle dispersion of, for example, a matting agent is prepared.

For a polarizing plate used for a liquid crystal display device, a plasticizer, an antioxidant, and a UV absorbent are preferably added to provide heat resistance and moisture resistance.

(Plasticizers)

In the present invention, a compound known as a so-called plasticizer is preferably added to a cellulose ester solution or a dope to enhance mechanical properties, provide flexibility and anti-water absorbability, reduce a water vapor transmission rate, and control retardation. For example, a phosphoric acid ester or a carboxylic acid ester is preferably used.

The phosphoric acid ester includes triphenyl phosphate, tricresyl phosphate, and phenyldiphenyl phosphate.

The carboxylic acid ester includes a phthalic acid ester and a citric acid ester. The phthalic acid ester includes, for example, dimethyl phthalate, diethyl phosphate, dioctyl phthalate, and diethylhexyl phthalate. The citric acid ester includes acetyl triethyl citrate and acetyl tributyl citrate. In addition, there are listed butyl oleate, methylacetyl ricinoleate, dibutyl sebacate, and triacetin. An alkylphthalyl alkylglycolate is also preferably used for this purpose. The alkyl of the alkylphthalyl alkylglycolate is an alkyl group having 1-8 carbon atoms. The alkylphthalyl alkylglycolate includes methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalyl methylglycolate, ethylphthalyl propylglycolate, propylphthalyl ethylglycolate, methylphthalyl propylglycolate, methylphthalyl butylglycolate, ethylphthalyl butylglycolate/butylphthalyl methylglycolate, butylphthalyl ethylglycolate, propylphthalyl butylglycolate, butylphthalyl propylglycolate, methylphthalyl octylglycolate, ethylphthalyl octylglycolate, octylphthalyl methylglycolate, and octylphthalyl ethylglycolate. Methylphthalyl methylglycolate, ethylphthalyl ethylglycolate, propylphthalyl propylglycolate, butylphthalyl butylglycolate, and octylphthalyl octylglycolate are preferably used. Further, these alkylphthalyl alkylglycolates can be used in combination of at least 2 types.

Further, polyhydric alcohol esters are also preferably used.

Polyhydric alcohol esters used in the present invention are represented by the following formula:

R1-(OH)n wherein R1 represents an organic group having a valence of n; n represents a positive integer of at least 2; and OH group represents at least one of an alcoholic hydroxyl group and a phenolic hydroxyl group.

A polyhydric alcohol ester-based plasticizer is one composed of an ester formed from an aliphatic polyhydric alcohol having a valence of at least 2 and a monocarboxylic acid, preferably having an aromatic or cycloalkyl ring therein. An aliphatic polyhydric alcohol ester having a valence of 2-20 is preferable.

As examples of a preferable polyhydric alcohol, there can be listed, for example, those cited below that by no means limit the scope of the present invention. The examples include adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane, and xylitol. Triethylene glycol, tetraethylene glycol, dipropylene glycol, tripropylene glycol, sorbitol, glycerin, trimethylol propane, and xylitol are specifically preferable.

Monocarboxylic acids used for the polyhydric alcohol ester are not specifically limited, and aliphatic monocarboxylic acids, alicyclic monocarboxylic acids, and aromatic monocarboxylic acids known in the art can be employed. Alicyclic monocarboxylic acids and aromatic monocarboxylic acids are preferable from the viewpoint of enhancing moisture permeability and retention properties.

As examples of preferable monocarboxylic acids, those can be cited below that by no means limit the scope of the present invention.

As the aliphatic monocarboxylic acid, straight or branched chain carboxylic acids having 1-32 carbon atoms can preferably be used. The number of carbon atoms is more preferably from 1-20, specifically preferably from 1-10. The inclusion of acetic acid is preferable to enhance compatibility with a cellulose ester, and further acetic acid and another carboxylic acid are used in combination.

Preferable aliphatic monocarboxylic acids include saturated fatty acids such as acetic acid, propionic acid, butyric acid, valeric acid, caproic acid, enantic acid, caprylic acid, pelargonic acid, capric acid, 2-ethyl hexanoate, undecylic acid, lauric acid, tridecylic acid, myristic acid, pentadecylic acid, palmitic acid, heptadecylic acid, stearic acid, nonadecanic acid, arachic acid, behenic acid, lignocelic acid, cerotic acid, heptacosanic acid, montanic acid, melisic acid, or lacceric acid; and unsaturated fatty acids such as undecylenic acid, oleic acid, sorbic acid, linolic acid, linolenic acid, or arachidonic acid.

AS examples of preferable alicyclic monocarboxylic acids, there can be cited cyclopentanecarboxylic acid, cyclohexanecarboxylic acid, and cyclooctanecarboxylic acid, or derivatives thereof.

AS examples of preferable aromatic monocarboxylic acids, there can be cited those formed by introducing an alkyl group into the benzene ring of benzoic acid such as benzoic acid or toluic acid; aromatic monocarboxylic acids having at least 2 benzene rings such as a biphenylcarboxylic acid, naphthalene carboxylic acid, or tetralin carboxylic acid, or derivatives thereof, but benzoic acid is specifically preferable.

The molecular weight of the polyhydric alcohol ester is not specifically limited, being preferably from 300-1500, more preferably from 350-750. Those having a larger molecular weight are preferable due to almost no tendency to volatilize, while those having a smaller molecular weight are preferable in view of moisture permeability and compatibility with a cellulose ester.

Only one type of carboxylic acid or a mixture of at least 2 types thereof may be used for the polyhydric alcohol ester. Further, all of the OH groups in the polyhydric alcohol may be esterified or a part thereof may remain as are.

These compounds are preferably contained at 1-30% by weight, preferably 1-20% by weight based on a cellulose ester. Further, to inhibit bleeding-out during stretching and drying, compounds featuring a vapor pressure of at most 1400 Pa at 200° C. are preferable.

These compounds may be added together with a cellulose ester or a solvent when a cellulose ester solution is prepared, or may be added during solution preparation or after the preparation.

Other additives include polyesters and polyester ethers described in JP-A No. 2002-22956; urethane resins described in JP-A No. 2003-171499; rosin and rosin derivatives, epoxy resins, ketone resins, toluenesulfonamide resins described in JP-A No. 2002-146044; esters of polyhydric alcohols and carboxylic acids described in JP-A No. 2003-96236; the compound represented by Formula (1) described in JP-A No. 2003-165868; polyester polymers or polyurethane polymers described in JP-A No. 2004-292696. These additives can be contained in a dope or a fine particle dispersion.

(UV Absorbents)

The cellulose ester film of the present invention can incorporate a UV absorbent.

Employable UV absorbents include, for example, oxybenzophenone based compounds, benzotriazole based compounds, salicylic acid ester based compounds, benzophenone based compounds, cyanoacrylate based compounds, nickel complex salt based compounds, and triazine based compounds. Benzotriazole compounds are preferable due to slight coloring. The UV absorbents described in JP-A Nos. 10-182621, 8-337574, and 2001-72782; and the polymer UV absorbents described in JP-A Nos. 6-148430, 2002-31715, 2002-169020, 2002-47357, 2002-363420, and 2003-113317 are also preferably used. Preferable UV absorbents include ones exhibiting excellent absorption capability for ultraviolet radiation of a wavelength of at most 370 nm from the viewpoint of protecting polarizer and liquid crystal deterioration, as well as exhibiting less absorption of visible light of a wavelength of at least 400 nm from the viewpoint of liquid crystal display performance.

Specific examples of useful UV absorbents for the present invention include mixtures of 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2H-benzotriazole-2-yl)-6-(straight or branched chain dodecyl)-4-methylphenol, or octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate. However, the present invention is not limited thereto. Further, as commercially available products, TINUVIN 109, TINUVIN 171, and TINUVIN 326 (all produced by Ciba Specialty Chemicals, Ltd.) can preferably be used. As a polymer UV absorbent, there can be exemplified reactive UV absorbent RUVA-93 produced by Otsuka Chemical Co., Ltd.

Specific examples of the benzophenone based compounds include 2,4-dihydroxy benzophenone, 2,2'-dihydroxy-4-methoxybenzophenone, 2-hydroxy-4-methoxy-5-sulfobenzophenone, and bis(2-methoxy-4-hydroxy-5-benzoylphenylmethane) with no limitation thereto.

Of the above UV absorbents preferably used in the present invention, preferable are benzotriazole based UV absorbents and benzophenone based UV absorbents exhibiting high transparency and having an excellent effect to prevent deterioration of a polarizing plate and a liquid crystal element, but the benzotriazole based UV absorbents featuring less undesired coloring are specifically preferably used.

Any method of adding a UV absorbent to a dope can be employed with no limitation provided that the UV absorbent is dissolved in the dope. In the present invention, a UV absorbent, having been dissolved in a good solvent to a cellulose ester such as methylene chloride, methyl acetate, or dioxolane, or in a mixed organic solvent of a good solvent and a poor solvent such as a lower aliphatic alcohol (e.g., methanol, ethanol, propanol, or butanol), may be added to a cellulose ester solution as a UV absorbent solution or may directly be added to a dope composition. Those insoluble in an organic solvent, similarly to inorganic powders, are dispersed in an organic solvent and a polymer using a dissolver or a sand mill, and then added to a dope.

The content of a UV absorbent is preferably 0.01-5% by weight, specifically preferably 0.5-3% by weight.

In the present invention, these UV absorbents may be used individually or in combination of at least 2 types.

(Antioxidants)

A hindered phenol based compound is preferably used as an antioxidant, including, for example, 2,6-di-t-butyl-p-cresol, pentaerithrityl-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene, and tris-(3,5-di-t-butyl-4-hydroxybenzyl)-isocyanurate. There are specifically preferable 2,6-di-t-butyl-p-cresol, pentaerithrityl-tetrakis[3-(3,5-di-t-butyl-4-hydroxyphenyl)propionate], and triethyleneglycol-bis[3-(3-t-butyl-5-methyl-4-hydroxyphenyl)propionate]. Further, a hydrazine based metal deactivator such as N,N'-bis[3-(3,5-di-t-butyl-4-hydroxyphenyl)propionyl]hydrazine or a phosphorus based processing stabilizer such as tris(2,4-di-t-butylphenyl)phosphite can be used in combination. The amount of these compounds added is preferably 1 ppm-1.0% by weight, more preferably 10-1000 ppm based on a cellulose ester.

(Fine Particles)

Fine particles such as matting agents can be added to the optical film of the present invention to provide slipping properties or to improve physical properties. The fine particles include inorganic or organic compound fine particles. The shape thereof to be employed is spherical, tabular, rod-shaped, acicular, layered, or irregular.

Examples of the inorganic fine compounds for the fine particles include metal oxides, hydroxides, silicates, phosphates, carbonates such as silicon dioxide, titanium dioxide, aluminum oxide, zirconium oxide, calcium carbonate, calcium carbonate, kaolin, talc, clay, fired calcium silicate, hydrated calcium silicate, aluminum silicate, magnesium silicate, and calcium phosphate.

Examples of the organic compound fine particles include fine particles of silicone resins, fluorine resins, and acryl resins, but silicone resins are preferable, being specifically preferably those featuring a three-dimensionally networked structure. For examples, TOSPERL 103, 105, 108, 120, 145, 3120, and 240 (produced by Toshiba Silicones Co., Ltd.) can be cited.

Of these, silicon dioxide is preferable since haze of a film can be reduced. Fine particles such as silicon dioxide are often previously surface-treated with an organic substance. Such particles are preferable to reduce the haze of a film. Organic substances suitable for such surface treatment include halosilanes, alkoxysilanes, silazane, and siloxane.

Fine particles of a larger average particle diameter result in enhanced slipping effects. In contrast, those of a smaller diameter exhibit excellent transparency. Further, the average particle diameter of the fine particles is in the range of 0.005-1.0 μm. Either primary particles thereof or secondary particles formed via aggregation thereof may be employable. The content of the fine particles is preferably 0.01-20 $g/m_2$ based on a resin.

Silicon dioxide fine particles include, for example, AEROSIL 200, 200V, 300, R972, R972V, R974, R202, R812, R805, OX50, and TT600 (produced by Aerosil Co., Ltd.), but AEROSIL 200V, R972, R972V, R974, R202, and R812 are preferable. These fine particles can be used in combination of at least 2 types. When at least 2 types thereof are used together, any mixing ratio is possible. In this case, fine particles featuring different average particle diameters or different materials, for example, AEROSIL 200V and R972V can be used in the range of a weight ratio of 0.1:99.9-99.9:0.1.

Fine particles present in a film as the matting agent can be used to enhance the strength of the film.

(Surfactants)

Surfactants are preferably contained in a dope or a fine particle dispersion used in the present invention, including phosphoric acid based, sulfonic acid based, carboxylic acid based, nonionic, and cationic based surfactants with no specific limitation. These are described in, for example, JP-A No. 61-243837. The amount of surfactants added is preferably 0.002-2% by weight, more preferably 0.01-1% by weight based on a cellulose acylate. When the added amount thereof is less than 0.001% by weight, an adding effect can not be sufficiently exhibited. In contrast, an added amount exceeding 2% by weight may result in deposition or formation of insoluble substances.

Nonionic surfactants are ones having, as a nonionic hydrophilic group, polyoxyethylene, polyoxypropylene, polyoxybutylene, polyglycidyl, or sorbitan. Specifically, there can be listed polyoxyethylene alkyl ethers, polyoxyethylene alkylphenyl ethers, polyoxyethylene-polyoxypropylene glycol, polyhydric alcohol fatty acid partial esters, polyoxyethylene polyhydric alcohol fatty acid partial esters, polyoxyethylene fatty acid esters, polyglycerin fatty acid esters, fatty acid diethanolamides, and triethanolamine fatty acid partial esters.

As anionic surfactants, there are listed carboxylic acid salts, sulfuric acid salts, sulfonic acid salts, and phosphoric acid ester salts, typically including fatty acid salts, alkylbenzene sulfonic acid salts, alkylnaphthalene sulfonic acid salts, alkylsulfonic acid salts, α-olefin sulfonic acid salts, dialkyl sulfosuccinic acid salts, α-sulfonated fatty acid salts, N-methyl-N-oleyltaurine, petroleum sulfonic acid salts, alkylsulfuric acid salts, sulfated oil and fat, polyoxyethylene alkyl ether sulfuric acid salts, polyoxyethylene alkylphenyl ether sulfuric acid salts, polyoxyethylene styrenated phenyl ether sulfuric acid salts, alkylphosphoric acid salts, polyoxyethylene alkyl ether phosphoric acid salts, and naphthalene-sulfonic acid salt formaldehyde condensates.

AS cationic surfactants, there can be listed amine salts, quaternary ammonium salts, and pyridinium salts, including primary-tertiary aliphatic amine salts and quaternary ammonium salts (such as tetraalkyl ammonium salts, trialkylbenzyl ammonium salts, alkylpyridinium salts, and alkylimidazolium salts). Amphoteric surfactants are, for example, carboxybetaine and sulfobetaine, including N-trialkyl-N-carboxymethyl ammoniumbetaines and N-trialkyl-N-sulfoalkylene ammoniumbetaines.

Fluorine based surfactants are ones having a fluorocarbon chain as a hydrophobic group.

(Peeling Accelerators)

Further, peeling accelerators may be added to a dope to reduce load during peeling, for which surfactants are effective, and these include phosphoric acid based, sulfonic acid based, carboxylic acid based, nonionic, and cationic surfactants with no specific limitation. Such peeling accelerators are described in, for example, JP-A No. 61-243837. Polyethoxylated phosphoric acid esters are disclosed as peeling accelerators in JP-A No. 57-500833. JP-A No. 61-69845 discloses that rapid peeling is realized by adding a mono or diphosphoric acid alkyl ester, wherein a non-esterified hydroxy group is in the form of a free acid, to a cellulose ester. Further, JP-A No. 1-299847 discloses that peeling load can be reduced by adding a phosphoric acid ester compound, containing a non-esterified hydroxyl group and a propylene oxide chain, as well as inorganic compound particles.

(Other Additives)

In addition, there may be added a heat stabilizer including inorganic fine particles such as kaolin, talc, diatomaceous earth, quartz, calcium carbonate, barium sulfate, titanium oxide, or alumina; and salts of alkaline earth metals such as calcium or magnesium. Further, an antistatic agent, flame retardant, slipping agent, or oil may be added.

And now, the method for manufacturing an optical film of the present invention is carried out via a solution casting film forming method, including a dope preparation, a casting, a drying, and a winding process.

Dissolving Process

Initially, a cellulose ester will now be described as an example of thermoplastic resin raw materials (polymer materials). The cellulose ester is commonly dissolved in a dissolving vessel via a stirring dissolution method, a heating dissolution method, or an ultrasound dissolution method. More preferable is a method in which heating is carried out under pressure at a temperature in the range from the boiling point of a solvent under ordinary pressure to a temperature at which the solvent does not yet boil, followed by dissolution while stirring in order to prevent occurrence of massive, insoluble substances called gel or massive substances resulting from aggregated powders. Further, the cooling dissolution method described in JP-A No. 9-95538 or the method for dissolution under pressure described in JP-A No. 11-21379 may be employed.

A method, in which a cellulose ester is wetted or swollen by mixing with a poor solvent, followed by being dissolved via mixture with a good solvent, may preferably be used. In this case, it is possible to separate an apparatus to wet or swell the cellulose ester by mixing with a poor solvent from an apparatus for dissolution by mixing with a good solvent.

In the present invention, the type of the dissolving vessel (pressurized container) is not specifically taken into account, provided that resistance to a predetermined pressure can be expressed and heating can be conducted while stirring under pressure. In addition, the dissolving vessel (pressurized container) is equipped with measuring instruments such as a pressure gauge and a thermometer, as appropriate. Pressuring may be performed via a method of injecting an inert gas such as nitrogen gas or via elevation of the vapor pressure of a solvent by heating. External heating is preferably carried out. For example, preferable is a jacket type due to easy temperature control.

Heating temperature during addition of a solvent is at least the boiling point of a solvent to be used. A mixed solvent of at least 2 kinds is heated at a temperature of at least the boiling point of a lower boiling point solvent, as well as at a temperature in the range where the solvent does not boil. When the heating temperature is excessively high, a higher pressure is required, resulting in decreased productivity. The heating temperature is preferably in the range of 20-120° C., more preferably 30-100° C., still more preferably 40-80° C. Further, the pressure is controlled at a predetermined temperature so as for the solvent not to boil.

Any additives needed such as a plasticizer or a UV absorbent other than a cellulose ester and a solvent may be mixed with a solvent and dissolved or dispersed, followed by being added to the solvent prior to cellulose ester dissolution; or may be added to a dope after cellulose ester dissolution.

After dissolving the cellulose ester, the resulting product is removed from the container while cooling or is extracted from the container using a pump and cooled with a heat exchanger, and thereafter the thus-obtained cellulose ester dope is used for film formation. At this moment, the cooling temperature may be allowed to decrease to room temperature.

In the method of the present invention, a cellulose ester dope is filtered to eliminate foreign substances, specifically ones which may mistakenly be recognized as images on the screen of a liquid crystal display device. It could be said that the quality as an optical film is determined by this filtration.

Casting Process

A process is carried out as follows: a dope prepared in a dissolving vessel is sent to a casting die via a delivery pipe and then the dope is cast from the casting die at a casting location on an endless support, which enables infinite conveyance, namely for example, a support constituted of an endless stainless steel belt rotationally driven. The surface of the support is mirror-finished.

As shown in FIG. 7, a dope-casting die (4), functioning to cast a dope which is a film raw material solution, is provided above the surface (casting face) of the upper moving portion of a belt support (1) constituted of an endless belt wound around a pair of front and rear drums (2) and (3). Herein, the front-side drum (2), around which the belt support (1) is wound, is, for example, a hot water drum, and the rear-side drum (3) is, for example, a cold water drum.

A casting die (4) (for example, a pressure type die) is preferable, since the slit shape of the head portion can be adjusted and can easily realize uniform film thickness. The casting die (4) includes a coat hanger die and a T die, and any of these is preferably employable. To raise the film forming rate, lamination may be carried out by dividing the dope amount via arrangement of at least 2 casting dies above the support. Then, a dope, the viscosity of which has been adjusted to be 1-200 poise, is cast on the support (1) from the casting die (4) to an almost uniform film thickness.

In the present invention, a dope (solution), prepared by dissolving a cellulose ester based resin in a solvent, is cast on the moving belt support (1) from the casting die (4) for film formation.

Herein, in the inventions of Items 1-5 of the present invention, the thickness (Te) of both right and left end portions (1b) of an endless metal belt (belt support) (1) each having a predetermined width (We) from both right and left side edges of the belt support wound around a pair of rotationally-driven front and rear drums (2) and (3) is smaller than the thickness (T) of the remaining portion (1a) including the transverse center portion of the belt support.

Further, in the inventions of Items 6-10, the longitudinal elastic modulus (Ee) of both right and left end portions (1b) of a wide belt support (1) featuring a width of at least 1.8 m each having a predetermined width (We) from both right and left side edges of the belt support is smaller than the longitudinal elastic modulus (E) of the remaining portion (1a) including the transverse center portion of the belt support.

Via any of the methods of the present invention, even when a wide belt support (1) is used in film manufacturing, a steady conveyance state with minimal meandering is maintained; neither incomplete drying of cast film (web) end portions nor deterioration of the flatness of the film occurs; and then high productivity can stably be maintained.

Solvent Evaporating Process

A process is carried out as follows: a dope film (web), having been formed by casting a dope on an endless belt (belt support), is heated on a belt support, and a solvent is evaporated until the web becomes peelable from the belt support.

To evaporate the solvent, there are employed at least one of the methods including a method of blowing from the web side, a method of heat transfer form the rear side of the belt support using liquid, and a method of heat transfer from the front and rear sides via radiation heat.

Peeling Process

A process is conducted as follows: A web, from which a solvent has been evaporated on a belt support, is peeled using a peeling roll. The peeled web is sent to a subsequent process. When the remaining solvent amount (refer to the expression to be described later) of the web on peeling is excessively large, the web is hard to peel. In contrast, when peeled after sufficient drying on the belt support, the web tends to be partially removed in the middle of peeling. In the present invention, when a thin web is peeled from a support, peeling is preferably carried out, without deterioration of the flatness or occurrence of wrinkles, at a peeling tension from the minimum tension enabling peeling to at most 170 N/m, more preferably at most 140 N/m.

A gel casting method is a method of increasing the film forming rate (which can increase the film forming rate since peeling is conducted while a sufficient amount of the remaining solvent still exists). This method includes a method in which a poor solvent to a cellulose ester is added in a dope, followed by dope casting for gelling; and a method of gelling by decreasing the temperature of the support. Enhanced strength of the film during peeling, having been gelated on the support, makes it possible to accelerate peeling and increase the film forming rate. The web, dried on the support in the range of 5-150% by weight, can be peeled depending on the strength of the conditions and the length of the support. However, peeling with a larger amount of the remaining solvent tends to result in deteriorated flatness during peeling, or occurrence of wrinkles or longitudinal streaks due to peeling tension when the web is excessively soft. Then, the remaining solvent during peeling is determined by the balance between the economical speed and quality. Accordingly, in the present invention, the temperature at the peeling location on the support is preferably set at 10-40° C., more preferably 15-30° C.

To maintain excellent flatness of a cellulose ester film during manufacturing, the remaining solvent amount during peeling from a support is preferably allowed to be 10-150% by weight, more preferably 70-150% by weight, still more preferably 100-130% by weight. The ratio of a good solvent contained in the remaining solvent is preferably 50-90%, more preferably 60-90%, specifically preferably 70-80%.

In the present invention, the remaining solvent is represented by the following expression:

$$\text{Remaining solvent (\% by weight)} = [(M-N)/N] \times 100$$

wherein M represents the weight of a web at any point of time which is determined using the following gas chromatography, and N represents the weight after drying at 110° C. for 3 hours wherein the M is changed to N. Determination can be carried out, for example, using gas chromatography 5890-type SERISII and head space sampler HP7694 produced by Hewlett-Packard Co.

Drying Process

After peeling form a support, a web is commonly dried using a roll drying apparatus conveying the web via alternate passing through a plural conveyance rollers, as well as using a tenter conveying the web by holding both ends thereof. As a drying method of the web (film), a method of hot air blowing onto the surface of the web (film) is commonly employed.

Stretching Process

In a stretching process employing a tenter, for example, the stretching magnification during manufacture of a cellulose ester film is a factor of 1.01-3 in the film forming direction or the transverse direction, preferably a factor of 1.5-3. In the case of stretching in the biaxial direction, it is possible to carry out stretching at a factor of 1.01-3, preferably 1.5-3 in the stretching direction of large magnification, and at a factor of 0.8-1.5, preferably 0.9-1.2 as the stretching magnification in the other direction.

It is preferable to maintain such widths or to conduct stretching in the transverse direction in the film forming process using a tenter, either a pin tenter or a clip tenter.

After the stretching process employing a tenter, a post-drying process is preferably provided. The film conveyance tension in the post-drying process depends on the dope physical properties, the remaining solvent amounts during peeling and in the film conveyance process, or the temperature in the post-drying process, being preferably 30-250 N/m, more preferably 60-150 N/m, most preferably 80-120 N/m.

To prevent film stretching in the conveyance direction in the post-drying process, a tension cut roll is preferably provided. After drying, a slitter to cut off end portions is provided before winding in order to realize an excellent wound shape.

Winding Process

A process is carried out as follows: the thus-dried web is wound as a film using a winder to obtain an optical film bulk roll. The remaining solvent amount of a film 14, having been dried, is at most 0.5% by weight, preferably at most 0.1% by weight, whereby a film exhibiting excellent dimensional stability can be obtained.

As a winding method of the film, any appropriate winder commonly used may be employed. Tension controlling methods include a constant torque method, a constant tension method, a taper tension method, or a program tension control method of fixed internal stress, and these methods may appropriately be chosen.

The film thickness of the optical film of the present invention varies with the intended use, being, however, preferably in the range of 10-150 μm, more preferably 30-100 μm, specifically preferably 40-80 μm as a finished film, from the viewpoint of realizing a thin liquid crystal display device.

When the film thickness is excessively small, for example, no strength required for a polarizing plate protective film may be achieved. When the film thickness is excessively large, no superiority of thin film realization to conventional cellulose ester films results. For film thickness controlling, it is preferable to control the dope concentration, the liquid-sending amount of a pump, the slit gap of the head of a casting die, the pushing pressure of the casting die, and the support speed in order to realize a desired thickness. Further, using a film thickness detecting member as a member realizing uniform film thickness, it is preferably to carry out controlling by feeding back programmed feedback information to each of the above apparatuses.

In the processes from immediately after casting to drying through a solution casting film forming method, the ambience inside the drying apparatus may be an air ambience or an ambience of an inert gas such as nitrogen gas or carbon dioxide gas. However, needless to say, the danger of the explosion limit of an evaporating solvent in such a dry ambience must always be taken into account.

The optical film of the present invention is preferably used, due to its excellent moisture permeability and dimensional stability, as a liquid crystal display member, specifically a polarizing plate protective film. Especially, as a polarizing plate protective film strictly requiring both moisture permeability and dimensional stability, the optical film of the present invention is preferably used.

When a cellulose ester film is used as a polarizing plate protective film, alkali saponification treatment is commonly conducted to realize excellent adhesion to a polarizer. The film, having been subjected to alkali saponification treatment, is bonded to a polarizer using a polyvinyl alcohol aqueous solution serving as an adhesive. Thereby, when the contact angle of the cellulose ester film after alkali saponification treatment to water is large, incomplete bonding is carried out using polyvinyl alcohol, resulting in a problematic polarizing plate protective film.

When a cellulose ester film manufactured via the method of the present invention is used as an LCD member, enhanced flatness is required for the film to reduce light leakage. The center line average roughness (Ra) of an optical film is specified by JIS B 0601 and determination methods thereof include, for example, a stylus method and an optical method.

In the present invention, the center line average roughness (Ra) of a cellulose ester film is preferably at most 20 nm, more preferably at most 10 nm, specifically preferably at most 4 nm.

Next, there will now be described a polarizing plate employing a cellulose ester film manufactured via the method of the present invention as a polarizing plate protective film, as well as a liquid crystal display device employing the polarizing plate.

A polarizing plate can be prepared via a common method. The cellulose ester film of the present invention, having been subjected to alkali saponification treatment, is preferably bonded to at least one side of a polarizer prepared via immersion stretching of a polyvinyl alcohol based film in an iodine solution, using a completely saponified polyvinyl alcohol aqueous solution. The cellulose ester film of the present invention may also be applied to the other side, and optionally, another polarizing plate protective film may be employed. A commercially available cellulose film may be used as the polarizing plate protective film applied to the other side, instead of the cellulose ester film of the present invention. As the commercial available cellulose ester film, for example, KC8UX2M, KC4UX, KC5UX, KC4UY, KC8UY, KC12UR, KC8UY-HA, KC8UX-RHA, or KC8UX-RHA-N (all produced by Konica Minolta Opto, Inc.) are preferably used. Any appropriate film of a cyclic olefin resin, an acryl resin, polyester, or polycarbonate other than the cellulose ester film may be used as the polarizing plate protective film for the other side. In this case, since saponification suitability is low, bonding processing is preferably applied to the polarizer via an appropriate adhesive layer.

The polarizing plate is one in which the cellulose ester film of the present invention is used for at least one side of a polarizer as a polarizing plate protective film. In this case, the delayed phase axis of the cellulose ester film is preferably arranged substantially parallel or at right angles to the absorption axis of the polarizer.

This polarizing plate is preferably arranged as one of the polarizing plates arranged so as to sandwich a liquid crystal cell, being a horizontal electric field switching mode type, and then the cellulose ester film of the present invention is preferably arranged on the liquid crystal display cell side.

As a polarizer preferably used for the polarizing plate, a polyvinyl alcohol based polarizing film is listed, including those prepared by dyeing a polyvinyl alcohol based film with iodine and those dyed with a dichroic dye. As the polyvinyl alcohol based film, a modified polyvinyl alcohol based film modified with ethylene is preferably used. As the polarizer, those prepared as described below are used: a polyvinyl alcohol aqueous solution is subjected to film formation, and then the resulting product is uniaxially stretched and then dyed, or is dyed and then uniaxially stretched; and thereafter, durability treatment is preferably carried out using a boron compound.

The film thickness of the polarizer is 5-40 μm, preferably 5-30 μm, specifically preferably 5-20 μm. A polarizing plate is formed by bonding one side of the cellulose ester film of the present invention to the surface of the polarizer. Bonding is preferably performed using a water based adhesive containing a completely saponified polyvinyl alcohol as the main component. Further, a resin film other than the cellulose ester film can be bonded to the polarizing plate via an appropriate adhesive layer.

A polarizer is stretched in the uniaxial direction (commonly in the longitudinal direction). Accordingly, when being placed in a high temperature/high humidity ambience, a polarizing plate contracts in the stretching direction (commonly in the longitudinal direction) and elongates in the direction at right angles to the stretching direction (commonly in the transverse direction). As the film thickness of a polarizing plate protective film decreases, a polarizing plate exhibits a larger degree of elongation and contraction, and specifically, the magnitude of contraction of a polarizer increases in the stretching direction. Generally, a polarizer and a polarizing plate protective film are bonded together in such a manner that the stretching direction of the former coincides with the casting direction (the MD direction) of the latter. Therefore, in cases of realizing a thin polarizing plate protective film, it is important to control the degree of elongation and contraction specifically in the casting direction. The cellulose ester film of the present invention exhibits excellent dimensional stability, being, therefore, suitably used as such a polarizing plate protective film.

A polarizing plate can be structured in such a manner that a protective film is further bonded to one side of the polarizing plate and a separate film is bonded to the opposite side. The protective film and the separate film are used to protect the polarizing plate in shipping and product inspection thereof.

A liquid crystal display device employing an optical film prepared according to the present invention exhibits excellent quality without unevenness on the screen.

EXAMPLES

The present invention will now more specifically be described with reference to examples that by no means limit the scope of the present invention.

Examples 1-17

Examples 1-17 correspond to the inventions of Items 1-4. Initially, a dope was prepared in order to manufacture a cellulose acetate propionate film of a targeted dry film thickness of 80 μm via the method for manufacturing an optical film of the present invention employing a solution casting film forming method.

(Dope Preparation)
Cellulose acetate propionate: 100 parts by weight
(Acetyl group substitution degree: 1.95; propionyl group substitution degree: 0.7)
Triphenyl phosphate: 10 parts by weight
Ethyl phthalel glycol: 2 parts by weight
Methylene chloride: 300 parts by weight
Ethanol: 40 parts by weight TINUVIN 326 (produced by Ciba Specialty Chemicals, Ltd.): 1 part by weight AEROSIL 200V (produced by Nihon Aerosil Co., Ltd.): 0.1 part by weight The above materials were sequentially placed in a sealed container and the temperature in the container was raised from 20° C. to 80° C., followed by stirring for 3 hours while the temperature was kept at 80° C. to completely dissolve cellulose triacetate propionate. Then, stirring was terminated and the liquid temperature was decreased to 43° C. Such a prepared dope was sent to a filter, followed by filtration using filter paper (Azumi Filter Paper No. 244 produced by Azumi Filterpaper Co., Ltd.) to obtain a casting dope.

The thus-prepared dope was cast on a belt support constituted of an endless stainless steel belt from a casting die kept warm at 35° C. to form a film (web). Then, the web was dried on the belt support until the remaining solvent amount thereof reached 80% by weight, and the film was peeled from the belt support using a peeling roll, followed by being dried during roll conveyance and then by being wound using a winder to finally prepare a cellulose triacetate propionate film of a width of 1700 mm.

Herein, as the belt support (1) shown in FIG. 1, a belt support (1) having a thickness falling within the range of the present invention was used, wherein, as listed in Table 1 to be shown later, the thickness (Te) of both right and left end portions (1b) of the belt support of a width of 1900 mm each having a width (We) of 2-25% of the total width (W) of the belt support when viewed from both right and left side edges thereof is allowed to be 5-20% less than the thickness (T) of the remaining portion (1a) including the transverse center portion of the belt support.

After the film forming operations for an accumulative period of 500 hours, there were evaluated 3 items which were the amount of belt end portion deformation, the amount of belt meandering (belt conveyance properties), and belt end portion observation (belt end portion dryness), as described below. The obtained results were listed together in Table 1.

Figure 8:
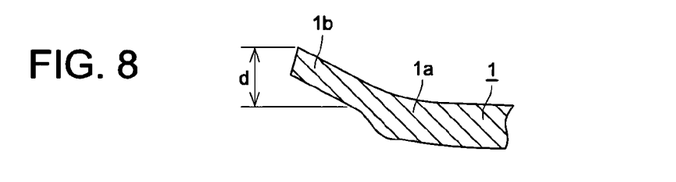
FIG. 8 is a main portion-enlarged cross-sectional view of a belt support end portion showing a determination method of the amount of deformation of a belt end portion in Examples 1-17 of the present invention.

Belt end portion deformation amount: The height difference (d) between the belt end portion (1b) and the belt center portion (1a) was measured as shown in FIG. 8. In measurement using laser displacement meter LK-010 (produced by Keyence Corp.), 1000 points at 10 mm regular intervals in the longitudinal direction with respect to 2 locations, being the farthest belt end portion (1b) and the belt center portion (1a), were measured. Then, each of the height differences (d) between the belt end portion (1b) and the belt center portion (1a) was plotted, and of the obtained peak heights, 10 peak heights were selected in decreasing order from the maximum value. The average value thereof was designated as the amount of belt end portion deformation.

In evaluation of the amount of belt end portion deformation, when the height difference (d) between the belt end portion (1b) and the belt center portion (1a) was at most 300 µm, the amount of belt end portion deformation was ranked as A, and ranked as B, C, and D when the height difference (d) was at most 500 µm, at most 1000 µm, and more than 1000 µm, respectively.

Belt meandering amount: As shown in FIG. 7, meandering control during conveyance using the belt support (1) was carried out via a method wherein the angle created by the rotational axes of a pair of the front and rear rotating drums (2) and (3) rotationally driving the belt support (1) was allowed to vary, and the rotational axis of the front rotating drum (2) was changed, to some extent, from a right angle to the moving direction of the belt support (1). Then, the position of the belt end portion (1b) was measured immediately before the driving drum (2), having a controlling function, using LS3000 (produced by Keyence Corp.) to calculate the amount of meandering with respect to the total belt width (W).

In evaluation of the amount of belt meandering, when the amount of belt meandering was at most ±0.2%, the conveyance properties was ranked as A from the reason that a steady conveyance state was maintained with minimal meandering; and ranked as B, C, and D when the amount of belt meandering was at most ±0.3%, at most ±0.5%, and more than ±0.5%, respectively.

Belt end portion observation: The surface of the belt immediately after peeling was observed to confirm the presence or absence of a portion remained unpeeled.

In evaluation of the belt end portion observation, when a portion remained unpeeled is absent, the belt end portion dryness was ranked as A, and ranked as B in the case of occurrence of a portion remained unpeeled.

Comparative Examples 1-25

For comparison, in the same manner as in Example 1, a cellulose acetate propionate film of a width of 1700 mm was prepared using a belt support of a width of 1900 mm, except that as shown in Table 2, at least one of the width (We) and the thickness (Te) of both right and left end portions (1b) of the belt support (1) was allowed to correspond to a ratio (marked with an asterisk) outside the range of the present invention.

After the film forming operations for an accumulated period of 500 hours, in the same manner as in Example 1, there were similarly evaluated the amount of belt end portion deformation, the amount of belt meandering (belt conveyance properties), and belt end portion observation (belt end portion dryness).

TABLE 1

|  | Decreasing Ratio of Belt End Portion Thickness (1 − Te/T) × 100 | Ratio of Belt End Portion Width We/W × 100 | Deformation Amount of Belt End Portion | Belt Conveyance Properties | Belt End Portion Dryness |
| --- | --- | --- | --- | --- | --- |
| Example 1 | 5% | 2% | B | B | A |
| Example 2 | 5% | 12% | B | B | A |
| Example 3 | 5% | 25% | B | B | A |
| Example 4 | 8% | 10% | A | A | A |
| Example 5 | 8% | 12% | A | A | A |
| Example 6 | 8% | 20% | A | A | A |
| Example 7 | 10% | 2% | B | B | A |
| Example 8 | 10% | 10% | A | A | A |

TABLE 1-continued

|  | Decreasing Ratio of Belt End Portion Thickness (1 − Te/T) × 100 | Ratio of Belt End Portion Width We/W × 100 | Deformation Amount of Belt End Portion | Belt Conveyance Properties | Belt End Portion Dryness |
|---|---|---|---|---|---|
| Example 9 | 10% | 12% | A | A | A |
| Example 10 | 10% | 20% | A | A | A |
| Example 11 | 10% | 25% | B | B | A |
| Example 12 | 15% | 10% | A | A | A |
| Example 13 | 15% | 12% | A | A | A |
| Example 14 | 15% | 20% | A | A | A |
| Example 15 | 20% | 2% | B | B | A |
| Example 16 | 20% | 12% | B | B | A |
| Example 17 | 20% | 25% | B | B | A |

TABLE 2

|  | Decreasing Ratio of Belt End portion Thickness (1 − Te/T) × 100 | Ratio of Belt End Portion Width We/W × 100 | Deformation Amount of Belt End Portion | Belt Conveyance Properties | Belt End Portion Dryness |
|---|---|---|---|---|---|
| Comp. 1 | * 3% | * 1% | D | B | B |
| Comp. 2 | * 3% | 2% | D | B | B |
| Comp. 3 | * 3% | 12% | D | B | B |
| Comp. 4 | * 3% | 25% | D | B | B |
| Comp. 5 | * 3% | * 26% | D | B | B |
| Comp. 6 | 5% | * 1% | D | B | B |
| Comp. 7 | 5% | * 26% | D | C | B |
| Comp. 8 | 5% | * 30% | D | C | B |
| Comp. 9 | 10% | * 1% | D | B | B |
| Comp. 10 | 10% | * 26% | C | D | B |
| Comp. 11 | 10% | * 30% | C | D | B |
| Comp. 12 | 20% | * 1% | D | B | B |
| Comp. 13 | 20% | * 26% | B | D | B |
| Comp. 14 | 20% | * 30% | B | D | B |
| Comp. 15 | * 22% | * 1% | D | B | B |
| Comp. 16 | * 22% | 2% | D | B | B |
| Comp. 17 | * 22% | 12% | B | B | B |
| Comp. 18 | * 22% | 25% | B | B | B |
| Comp. 19 | * 22% | * 26% | B | D | B |
| Comp. 20 | * 22% | * 30% | B | D | B |
| Comp. 21 | * 30% | * 1% | D | B | B |
| Comp. 22 | * 30% | 2% | D | B | B |
| Comp. 23 | * 30% | 12% | B | D | B |
| Comp. 24 | * 30% | 25% | B | D | B |
| Comp. 25 | * 30% | * 26% | B | D | B |

Comp.: Comparative Example

The results of Table 1 clearly showed that according to Examples 1-17 of the present invention, each of the amounts of belt end portion deformation, the amounts of belt meandering (belt conveyance properties), and the belt end portion observations (belt end portion dryness) was rated high; since deformation of both film end portions, tending to occur when a wide belt support was used in film manufacturing, was reduced, by allowing the thicknesses of the belt end portions (or edge portions) on the right and left sides of the belt support to be smaller, stress loaded to the belt support during meandering control was reduced and deformation of the both end portions of the belt support after long-term operations was inhibited; and therefore, even when a wide belt support was used in film manufacturing, a steady conveyance state with minimal meandering was maintained and high productivity was able to be maintained stably without incomplete drying of cast film (web) end portions or deterioration of the flatness of the film.

It was shown that of these, with regard to Examples 4-6, 8-10, and 12-14 satisfying the relationships of $10(\%) \leq (We/W) \times 100 \leq 20(\%)$ and $8(\%) \leq (1-Te/T) \times 100 \leq 15(\%)$, excellent effects were specifically produced.

In contrast, with regard to Comparative Examples 1-25, either one or two of the amount of belt end portion deformation, the amount of belt meandering (belt conveyance properties), and the belt end portion observation (belt end portion dryness) were rated low. In all of Comparative Examples 1-25, incomplete drying of cast film (web) end portions occurred, and also in some of Comparative Examples, a large amount of belt meandering and an unsteady conveyance state were confirmed.

Incidentally, in above Examples 1-17 and Comparative Examples 1-25, a film of a width of 1700 mm was prepared using a belt support of a width of 1900 mm. However, it is possible to prepare a wider film depending on the film forming conditions after peeling. Further, when the width of a belt support is more than 1900 mm, a wider film can be prepared.

Examples 18-23

Examples 18-23 correspond to the inventions of Items 6-10. Belt test sample pieces (belt supports) (11) featuring a total width of 500 mm and a length of 1000 mm were prepared. One side edge of the sample piece body (11a) of each of the belt test sample pieces (11) is welded to the sample piece end portion (11b).

As a material of the belt test sample piece (11), SUS316 (longitudinal elastic modulus: 220 GPa) was used. Further, for the sample piece end portion (11b), the longitudinal elastic modulus was adjusted via appropriate combination of 2 types of materials made from SUS316 treated at different temperatures (longitudinal elastic modulus: 220 and 200 GPa); SUS304 (longitudinal elastic modulus: 190 GPa); and 2 types of materials made from SUS405 treated at different temperatures (longitudinal elastic modulus: 180 and 175 GPa).

Herein, the sample piece end portion (11b) features, as shown in Table 3, a width (We) of 2-25% of the total width (W) of the belt test sample piece (belt support) (11) when viewed from one side edge thereof. The longitudinal elastic modulus (Young's modulus) (Ee) of the sample piece end portion (11b) is allowed to be smaller than the longitudinal elastic modulus (E) of the remaining sample piece body (11a) within a range of 5-20% of the present invention. These prepared belt test sample pieces (11) were set on the devices shown in FIGS. 9 and 10, followed by repetitive load application to measure the amount of end portion deformation of each of the belt test sample pieces (belt supports) (11).

Figure 9:
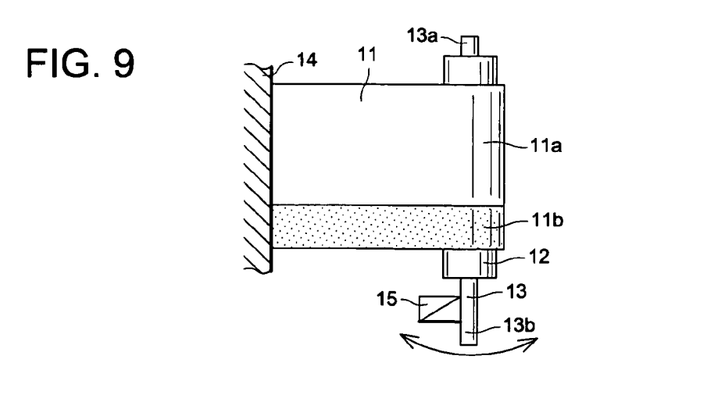
FIG. 9 is a plan view of an experimental device to measure the amount of deformation of a belt support end portion via repetitive load application to a belt test sample piece in Examples 18-23 of the present invention.
Figure 10:
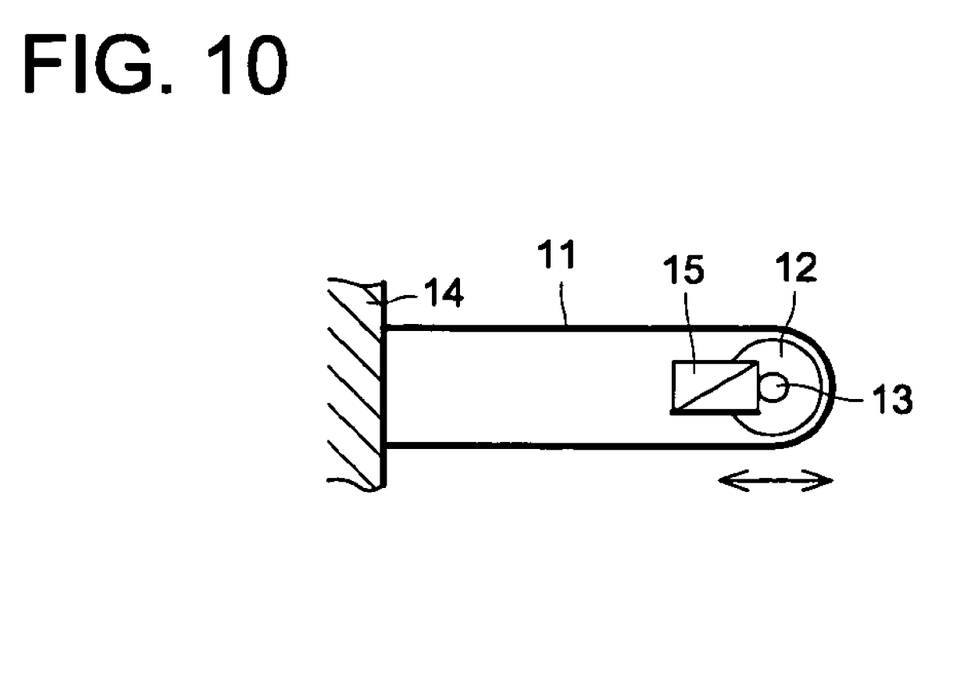
FIG. 10 is a corresponding side view.

As shown in FIGS. 9 and 10, the belt test sample piece (belt support) (11) is wound around a roll (12) of a diameter of 100 mm at a lap angle of 180°, and both ends of the longitudinal direction of the belt test sample piece (belt support) (11) are fixed to a wall (14). The roll (12) entirely moves in an oscillation manner at a supporting point of the end portion (13a) on one side of a roll axis (13) using a reciprocating driving source unshown. The end portion (13b) on the moving side of the roll axis (13) is provided with a tension meter (15) to measure tension loaded to the end portion of the belt test sample piece (belt support) (11), and the belt is fixed so as for the tension to be 9800 N. In this condition, the roll axis on the moving side is oscillated at 0.5 Hz so that the tension may be varied at ±10%. This test was conducted for 100 hours, followed by the same measurement of the amount of deformation of the end portion of the belt test sample piece (belt support) (11) to carry out evaluation based on the identical criteria for the case of above Example 1. The obtained results were listed in Table 3.

Comparative Examples 26-32

For comparison, in the same manner as in above Example 18, a belt test sample piece (belt support) (11) of a total width of 500 mm and a length of 1000 mm was used, except that as shown in Table 3, at least one of the width (We) and the thickness (Te) of the sample piece end portion (11b) was allowed to correspond to a ratio (marked with an asterisk) outside the range of the present invention. In the same manner as in Examples 18-23, these prepared belt test sample pieces (11) were set on the devices shown in FIGS. 9 and 10, followed by repetitive load application to measure the amount of end portion deformation of each of the belt test sample pieces (belt supports) (11). The obtained results were listed together in following Table 3.

TABLE 3

| | Longitudinal Elastic Modulus Decreasing Ratio of Belt End Portion (1 − Ee/E) × 100 | Ratio of Belt End Portion Width We/W × 100 | Deformation Amount of Belt End Portion |
|---|---|---|---|
| Example 18 | 5% | 3% | B |
| Example 19 | 5% | 12% | B |
| Example 20 | 5% | 25% | B |
| Example 21 | 18% | 3% | B |
| Example 22 | 18% | 12% | B |
| Example 23 | 18% | 25% | B |
| Comparative Example 26 | * 0% | 1% | D |
| Comparative Example 27 | * 3% | 12% | D |
| Comparative Example 28 | 5% | * 1% | D |
| Comparative Example 29 | 5% | * 28% | D |
| Comparative Example 30 | 18% | * 1% | D |
| Comparative Example 31 | 18% | * 28% | D |
| Comparative Example 32 | * 23% | 12% | D |

The results of Table 3 clearly showed that according to Examples 18-23 of the present invention, each of the amounts of belt end portion deformation was rated high; by allowing the longitudinal elastic modulus of the belt end portion (or edge portion) of the belt test sample piece (belt support) (11) to be smaller, stress loaded to the belt support (11) during meandering control was reduced and deformation of the end portion of the belt support after long-term operations was inhibited; and a steady conveyance state with minimal meandering was able to be maintained.

Incidentally, in above Examples 18-23, a belt test sample piece (belt support) (11) of a total width of 500 mm and a length of 1000 mm was used for the experiments. The obtained results showed that when the longitudinal elastic modulus (Ee) of both right and left end portions of the wide belt support featuring a width of at least 1.8 m of the present invention each having a width (We) of 2-25% of the total width (w) of the belt support when viewed from the both right and left side edges thereof was allowed to be 5-20% less than the longitudinal elastic modulus (E) of the remaining portion including the transverse center portion of the belt support, deformation of both film end portions, tending to occur in cases of using a wide belt support in film manufacturing, was reduced; stress loaded to the belt support during meandering control was reduced and deformation of the both end portions of the belt support after long-term operations was inhibited; and a steady conveyance state with minimal meandering was maintained, and then high productivity was able to maintained stably without incomplete drying of cast film (web) end portions or deterioration of the flatness of the film.

In contrast, with regard to Comparative Examples 26-32, the amount of deformation of the belt end portion was rated low, resulting in a large amount of belt meandering as well as an unsteady conveyance state.

What is claimed is:

1. A method for manufacturing an optical film comprising the steps of:
   1) casting a solution, prepared by dissolving thermoplastic resin film raw materials in a solvent, from a casting die onto an at least 1.8 m wide belt support, and
   2) drying a cast film peeled from the belt support, wherein the belt support has a thickness (Te) at both right and left end portions, of 5-20% less than a thickness (T) of a remaining portion including a transverse center portion of the belt support, wherein the Te indicates a thickness at both right and left end portions, each having a width (We) of 2-25% of a total width (W) of the belt support when viewed from both right and left side edges thereof.

2. The method for manufacturing the optical film described in claim 1,
wherein the belt support has a thickness (Te) of 8-15% less than a thickness (T) of the remaining portion including the transverse center portion of the belt support, wherein the Te indicates a thickness at both right and left end portions, each having a width (We) of 2-25% of a total width (W) of the belt support when viewed from both right and left side edges thereof.

3. The method for manufacturing the optical film described in claim 1,
wherein the belt support has the thickness (Te) of 5-20% less than the thickness (T) of the remaining portion including the transverse center portion of the belt support, wherein the Te indicates the thickness at both right and left end portions, each having the width (We) of 10-20% of the total width (W) of the belt support when viewed from both right and left side edges thereof.

4. The method for manufacturing the optical film described in claim 1,
wherein the belt support has the thickness (Te) of 8-15% less than the thickness (T) of the remaining portion including the transverse center portion of the belt support, wherein the Te indicates the thickness at both right and left end portions, each having the width (We) of 10-20% of the total width (W) of the belt support when viewed from both right and left side edges thereof.

5. The method for manufacturing the optical film, described in claim 1,
wherein the belt support is united by welding of both right and left end portions having a thinner portion of the belt support and the remaining thicker portion including the transverse center portion.

6. A method for manufacturing an optical film comprising the steps of:
1) casting a solution, prepared by dissolving thermoplastic resin film raw materials in a solvent, from a casting die onto an at least 1.8 m wide belt support, and
2) drying a cast film peeled from the belt support,
wherein the belt support has a longitudinal elastic modulus (Ee) of both right and left end portions, each having a width (We) of 2-25% of a total width (W) of the belt support when viewed from both right and left side edges thereof, is 5-20% less than a longitudinal elastic modulus (E) of a remaining portion including a transverse center portion of the belt support.

7. The method for manufacturing the optical film described in claim 6,
wherein the belt support has the longitudinal elastic modulus (Ee) of both right and left end portions each having the width (We) of 2-25% of the total width (W) of the belt support when viewed from both right and left side edges thereof, is 8-15% less than the longitudinal elastic modulus (E) of the remaining portion including the transverse center portion of the belt support.

8. The method for manufacturing the optical film described in claim 6,
wherein the belt support has the longitudinal elastic modulus (Ee) of both right and left end portions, each having the width (We) of 10-20% of the total width (W) of the belt support when viewed from both right and left side edges thereof, is 5-20% less than the longitudinal elastic modulus (E) of the remaining portion including the transverse center portion of the belt support.

9. The method for manufacturing the optical film described in claim 6,
wherein the belt support has the longitudinal elastic modulus (Ee) of both right and left end portions, each having the width (We) of 10-20% of the total width (W) of the belt support when viewed from both right and left side edges thereof, is 8-15% less than the longitudinal elastic modulus (E) of the remaining portion including the transverse center portion of the belt support.

10. The method for manufacturing the optical film described in claim 6,
wherein the belt support is united by welding of both right and left end portions, featuring a smaller longitudinal elastic modulus, of the belt support and the remaining portion, featuring a larger longitudinal elastic modulus, including the transverse center portion.

11. The method for manufacturing an optical film described in claim 1,
wherein the width of the optical film is at least 1.7 m.

12. The method for manufacturing an optical film described in claim 1,
wherein the thermoplastic resin film raw materials contain a cellulose ester.

* * * * *